United States Patent
Murphy et al.

(10) Patent No.: US 7,718,288 B2
(45) Date of Patent: May 18, 2010

(54) INTEGRATION OF AN ELECTRICAL DIODE WITHIN A FUEL CELL

(75) Inventors: Michael W. Murphy, Manchester, NY (US); Mark Mathias, Pittsford, NY (US); David Chow, Newbury Park, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 1494 days.

(21) Appl. No.: 11/028,837

(22) Filed: Jan. 4, 2005

(65) Prior Publication Data

US 2006/0147769 A1    Jul. 6, 2006

(51) Int. Cl.
*H01M 8/04* (2006.01)
*H01M 8/10* (2006.01)

(52) U.S. Cl. .............................. 429/23; 429/7; 429/32
(58) Field of Classification Search ........................ None
See application file for complete search history.

(56) References Cited

U.S. PATENT DOCUMENTS

| 4,719,401 A | 1/1988 | Altmejd |
| 6,096,449 A | 8/2000 | Fuglevand et al. |
| 6,677,066 B1 | 1/2004 | Jansen et al. |
| 2002/0070390 A1* | 6/2002 | Chow .......................... 257/197 |
| 2004/0081866 A1 | 4/2004 | Bekkedahl et al. |
| 2005/0129988 A1* | 6/2005 | Knights et al. .................. 429/7 |

FOREIGN PATENT DOCUMENTS

DE       198 27 880 C1    12/1999

* cited by examiner

*Primary Examiner*—John S Maples
(74) *Attorney, Agent, or Firm*—John A. Miller; Miller IP Group, PLC

(57) ABSTRACT

A fuel cell system that employs a diode electrically coupled between bipolar plates in a fuel cell of a fuel cell stack for preventing the fuel cell between the plates from reversing its polarity. The diode is a thin-sheet p-n diode including doped semiconductor layers and has a thickness relative to the thickness of the MEA in the fuel cell so that the overall stack thickness does not increase. When the fuel cell is operating properly the diode does not conduct and all of the current through the fuel cell goes through the MEA. If the electric load on the stack increases to a level beyond the capability of the fuel cell, where the potential across the fuel cell goes significantly below zero, the diode will begin to conduct so that any current that cannot travel through the MEA with the cell voltage less than one negative forward diode voltage drop is able to go around the MEA through the diode.

21 Claims, 2 Drawing Sheets

INTEGRATION OF AN ELECTRICAL DIODE WITHIN A FUEL CELL

BACKGROUND OF THE INVENTION

1. Field of the Invention

This invention relates generally to a fuel cell and, more particularly, to a fuel cell that includes a thin-sheet diode electrically coupled to bipolar plates in the cell for preventing a polarity reversal of the fuel cell.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. For example, a typical fuel cell stack for a vehicle may have two hundred stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of each MEA. Cathode gas flow channels are provided on the cathode side of the bipolar plates that allow the cathode gas to flow to the cathode side of each MEA. The bipolar plates are made of a conductive material, such as stainless steel, so that they conduct the electricity generated by the fuel cells from one cell to the next cell as well as out of the stack. The bipolar plates also include flow channels through which a cooling fluid flows.

The polarity of an individual fuel cell within the fuel cell stack can be reversed (cell overload) if the stack load attempts to draw more electrical current from the stack than the cell can generate. Because the cells are electrically coupled in series, a low performing cell may experience cell overload if the normal operating cells are able to supply a high stack load. In this condition, the cathode side of the bipolar plate becomes more negative than the anode side of the bipolar plate in the cell causing reverse polarity. Therefore, the output current available from the stack is defined by the weakest performing cell in the stack.

Cell overload can occur if the anode side of the fuel cell is starved for hydrogen, i.e., the amount of hydrogen being provided to the cell is not enough to provide the desired power output. In this situation, the fuel cell may begin oxidizing the bipolar plate and the carbon instead of the hydrogen in the hydrogen flow channel. This condition may be permanently detrimental to the performance of the overloaded cell, and in turn the entire stack. It is also possible to reverse the polarity of the fuel cell by starving the cathode side of the cell of air. Reversing the polarity of the cell in this manner causes hydrogen evolution to occur on the cathode side of the overloaded cell. The simultaneous presence of hydrogen and oxygen on the cathode side is undesirable and can result in cell overheating and damage due to direct reaction.

The above described reverse polarity condition is prevented in known fuel cells by monitoring the voltage of each fuel cell in the stack, and increasing the hydrogen or air flow or reducing the load if the potential of any one of the cells drops to zero potential. For example, more hydrogen could be provided to the hydrogen flow field in the stack to increase the performance of the low performing cell. However, because the anode gas flow is in parallel with each cell, the extra hydrogen is wasted for those cells that are operating properly.

It is known in the electrical art that a diode can be electrically coupled in parallel with any other electrical device to limit the voltage applied to that device when power is applied from a source. A diode can effectively protect the device by allowing electrical current to flow around the device at some threshold voltage that is characteristic of the particular diode selected, instead of allowing the full power of the connected source to be applied to the device.

It is possible to electrically couple a diode in parallel with each fuel cell in a fuel cell stack to protect the stack by preventing the potential of the cells from dropping more than one forward diode voltage below zero. Selecting a diode that has a low forward voltage (as low as 0.1-0.2 V) means that at cell voltages greater than zero the diode looks like an open circuit, and electrically appears as if it isn't in the circuit. If a fuel cell voltage is dragged below zero past the forward voltage of the diode, the diode will become conductive. This would prevent the cell from going any lower than the negative forward voltage drop, and would cause electrical current to be routed from one bipolar plate to the next bipolar plate around the overloaded MEA in the cell. The diode will remain conductive until the load is lessened or removed from the stack, at which point the voltage of the cell would rebound, the diode would turn off, and the cell would be able to continue to operate at lighter loads.

There are a number of difficulties in implementing such a diode in a fuel cell stack, including handling the electrical currents in a typical stack. Currently, no diodes exist that are physically sized and shaped to fit into the cells of a fuel cell stack. Further, stack currents are typically too great to send the current outside of the stack so that the current could be routed through a diode external to the stack because the cabling required to do this would be too bulky.

SUMMARY OF THE INVENTION

In accordance with the teachings of the present invention, a fuel cell system is disclosed that employs a diode electrically coupled between bipolar plates in each fuel cell of a fuel cell stack to prevent the fuel cell between the plates from reversing its polarity. In one embodiment, the diode is a thin-sheet p-n diode including doped semiconductor layers that has a thickness relative to the thickness of the MEA in the fuel cell so that the overall stack thickness does not increase. The diode has a predetermined characteristic so that when the fuel cell is operating properly the diode does not conduct and all of the current propagating through the fuel cell goes through the MEA. If the electrical load on the stack increases to a level beyond the capability of a fuel cell, where the potential across that fuel cell goes significantly below zero, the diode will begin to conduct so that any current that cannot travel through the MEA with the cell voltage of less than one negative forward diode voltage drop is able to go around the MEA through the diode. Therefore, the weak performing cell will not limit the performance of the other cells in the stack.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell employing a diode for preventing fuel cell polarity reversal is merely exemplary in nature and is in no way intended to limit the invention or its applications or uses.

Figure 1:
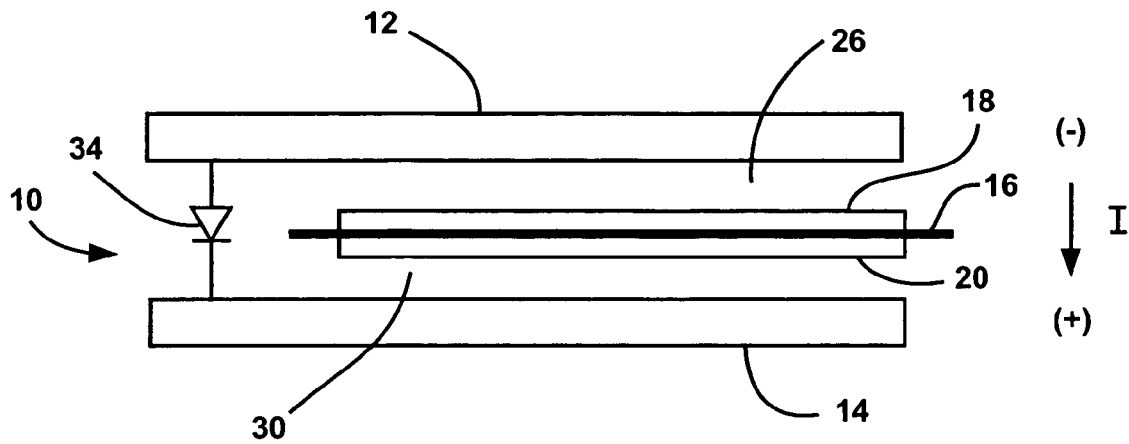
FIG. 1 is a cross-sectional view of one fuel cell of a fuel cell stack including a diode that prevents the cell from reversing its polarity, according to an embodiment of the present invention.

FIG. 1 is a cross-sectional view of a fuel cell 10 that would be one fuel cell of a fuel cell stack, for example, a fuel cell stack in a vehicle. The fuel cell 10 includes an anode-side bipolar plate 12 and a cathode-side bipolar plate 14 having an MEA 16 positioned therebetween. The MEA 16 includes a membrane on which a catalyst is deposited so that a catalyst layer of the MEA 16 faces both of the bipolar plates 12 and 14. In this example, an anode side of the bipolar plate 12 faces the MEA 16 and a cathode side of the bipolar plate 14 faces the MEA 16. The cathode side of the bipolar plate 12 would face the MEA of another fuel cell in the stack on one side of the fuel cell 10 and the anode side of the bipolar plate 14 would face the MEA of another fuel cell in the stack on the opposite side of the fuel cell 10. An anode diffusion media layer 18 is positioned against the anode side of the MEA 16 and the cathode diffusion media layer 20 is positioned against the cathode side of the MEA 16. The diffusion media layers 18 and 20 are porous layers that provide for input gas transport to and water transport from the MEA 16.

An anode flow channel 26 is provided between the anode diffusion media layer 18 and the bipolar plate 12, and a cathode channel 30 is provided between the cathode diffusion media layer 20 and the bipolar plate 14. Suitable manifolds (not shown) would be provided to direct the air cathode gas to the cathode channel 30 and the hydrogen anode gas to the anode channel 26 in a parallel manner for each fuel cell in the stack. FIG. 1 is a general representation of the fuel cell 10, where the flow channels 26 and 30 would not be in fluid communication with each other. Also, the anode flow channel 26 and the cathode flow channel 30 each would be one flow channel of a plurality of parallel flow channels for the fuel cell 10. In an alternate embodiment, the flow channels 26 and 30 could be in a perpendicular direction to each other.

According to the invention, a diode 34 is electrically coupled to the bipolar plates 12 and 14, where a terminal of the diode 34 is electrically connected to the anode side of the bipolar plate 12 and a terminal of the diode 34 is electrically connected to the cathode side of the bipolar plate 14. At least one and potentially all of the fuel cells in the fuel cell stack would include diodes of this type. When the fuel cell 10 is operating normally, the bipolar plate 12 has a negative potential and the bipolar plate 14 has a positive potential relative to each other, as shown. As will be discussed in detail below, the diode 34 prevents the potential of the bipolar plate 14 from going more than one forward diode voltage drop below the potential of the bipolar plate 12, thus preventing a reverse polarity condition of the fuel cell 10.

Figure 2:
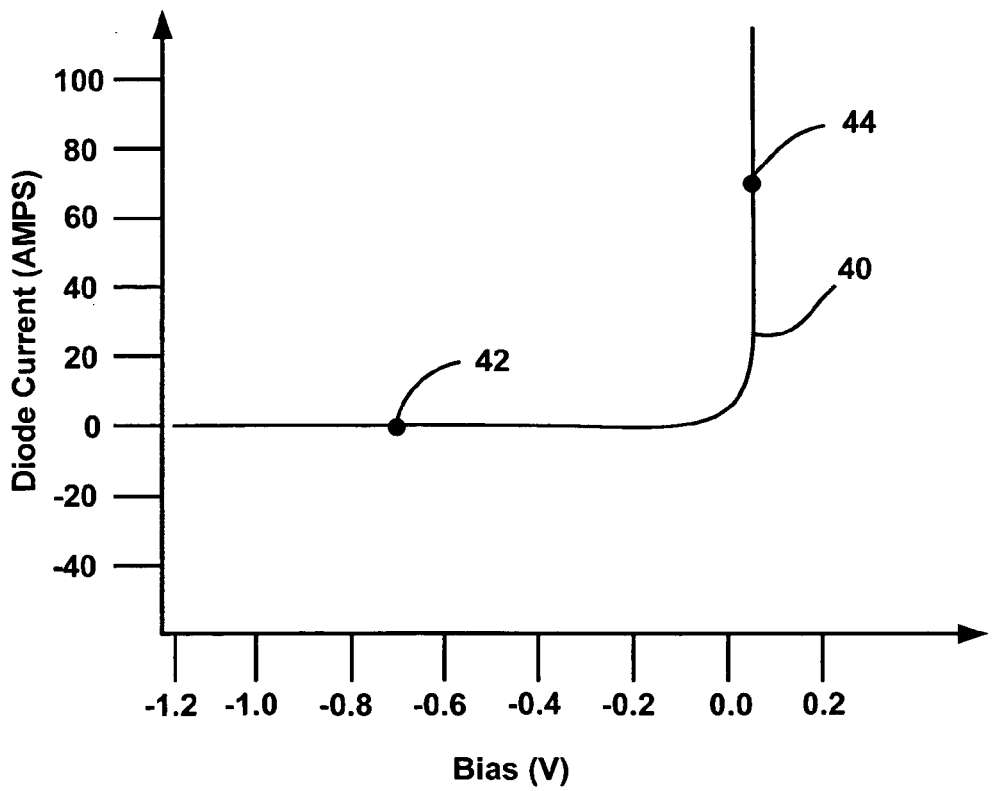
FIG. 2 is a graph with diode bias on the horizontal axis and current density on the vertical axis showing the voltage characteristic of the diode in FIG. 1.

FIG. 2 is a graph with voltage on the horizontal axis and diode current on the vertical axis. Graph line 40 shows the characteristic curve of the diode 34. Note that the voltage across the diode 34 is defined as the potential of the anode side of the diode 34 (potential on the plate 12) minus the potential on the cathode side of the diode 34 (potential on the plate 14). Positive current on the diode 34 is defined as positive charge flowing from the anode side of the diode 34 to the cathode side of the diode 34. Point 42 represents the normal operating point of the MEA 16 and point 44 represents a failure point or reverse polarity point of the MEA 16. When the fuel cell 10 is operating normally, the diode 34 will typically have a potential difference across it of about −0.7 to −0.8 volts. At this fuel cell potential, the current through the diode 34 is about zero and is not conducting. Therefore, all of the electrical current through the fuel cell 10 travels through the MEA 16. If the anode channel 26 or the cathode channel 30 becomes starved of input gas for a particular external load on the fuel cell stack, the potential across the fuel cell 10 will approach zero. When the potential becomes negative by more than one forward diode voltage drop, the diode 34 begins to conduct, thus preventing the fuel cell 10 from having a reverse polarity, which could damage the cell 10. The currents shown in FIG. 2 are for a diode-fuel cell pair having a ratio of areas on the order of 50:1, for example, a 1 $cm^2$ diode in parallel with a 50 $cm^2$ fuel cell. The diode current could be higher or lower, depending on the ratios of these areas.

In the example shown in FIG. 2, the diode 34 has an insulating property between 0 and −1 volts and a conducting property for other potentials. When the load on the fuel cell stack draws more current than the fuel cell 10 can handle, the MEA 16 still conducts the maximum current it is able to, and the diode 34 conducts the difference between the maximum current conduction of the MEA 16 and the current out of the fuel cell stack that is supported by the other cells in the stack. Therefore, as long as the current drawn from the stack is greater than the current that can be generated by the MEA 16, the potential between the bipolar plates 12 and 14 (potential on the plate 14 minus the potential on the plate 12) will be only slightly less than zero volts.

The diode 34 can be any diode suitable for the purposes described herein. In one embodiment, the diode 34 is a PN diode that has a low voltage operating potential (0.1-0.2 forward bias voltage) and a high temperature operation, and thus, provides better reliability than Schottky diodes. Also, in one embodiment, the diode 34 is a thin-sheet semiconductor diode having a thickness that is about the same as the MEA 16. Suitable semiconductor materials include InAs and GaInAs. InAs is better for forward bias characteristics and GaInAs is better for reverse bias characteristics.

According to the invention, the diode 34 has an aspect ratio that allows it to be positioned between the existing bipolar plates of a fuel cell adjacent to the MEA, and provide the diode characteristic as discussed above. In one example, the diode 34 has a thickness in the range of 50 microns to 1.3 mm and an area in the range of 0.2-5.0 $cm^2$ for an MEA with an active area of about 50 $cm^2$. The area of the diode 34 will depend on the size of the MEA 16, increasing for larger active area MEAs. The direction of current flow in the diode 34 is through-plane. The diode 34 is designed to turn off near zero volts and to have high conductivity in the "on" state. The bipolar plates 12 and 14 have a region outside of the normal cell active area where the diode sheet can be positioned. By providing a diode sheet of these dimensions, the increase of the stack dimension can be limited to less than 10%.

Figure 3:
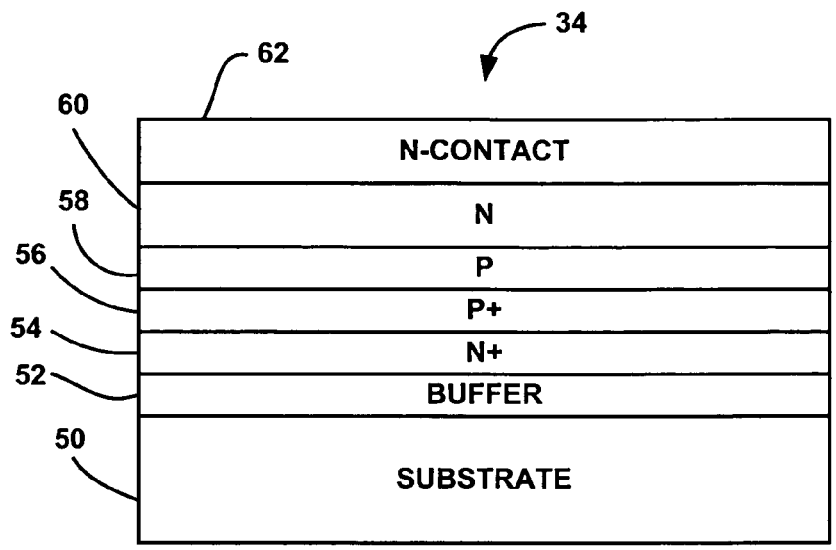
FIG. 3 is a cross-sectional view of the diode shown in FIG. 1.

FIG. 3 is a cross-sectional view of one example of the diode 34 that satisfies the criteria mentioned above. The diode 34 includes a semiconductor substrate layer 50 on which is deposited a buffer layer 52. In one embodiment, the substrate layer 50 is an n-type InAs wafer and the buffer layer 52 is a 2000 Å n-type InAs layer. A tunnel junction is fabricated over the buffer layer 52 and includes an N+ 1000 Å InAs layer 54 doped with silicon at $-1.0 \times 10^{19}$ and a P+ 1000 Å InAs layer 56 doped with beryllium at $1.0 \times 10^{19}$. A p-n diode is fabricated over the tunnel junction and includes a 1000 Å InAs P layer 58 doped with beryllium at $1.0 \times 10^{18}$ and a 2000 Å InAs undoped N layer 60. An N-contact layer 62 is deposited over the p-n diode and is a 2000 Å InAs N layer doped with silicon at $-1.0 \times 10^{19}$.

In order to test the effectiveness of the diode 34 to prevent a fuel cell voltage reversal, two 50 $cm^2$ single cell fuel cells were built, one having a diode electrically in parallel with the fuel cell and one not having a diode. Both of these fuel cells were operated under the following conditions. On the anode side, the gas composition was 50% $H_2$ and 50% $N_2$, the gas flow rate was a fixed flow of 140 sccm equivalent to a stoichiometry of 1.0 for a load of 0.2 A/$cm^2$ in a 50 $cm^2$ cell, the relative humidity was 100% at 80° C. and the pressure was 1 atmosphere. On the cathode side of the fuel cell, the gas composition was 100% air, the gas flow rate was a fixed flow of 333 sccm equivalent to a cathode stoichiometry of 2.0 for a load of 0.2 A/$cm^2$ in a 50 $cm^2$ cell, the relative humidity was 100% at 80° C. and the pressure was 1 atmosphere. Each cell was then connected to an electrical load starting at 0 amps. The load was increased in increments of 0.02 A/$cm^2$, which is in one amp steps for a 50 $cm^2$ cell.

Figure 4:
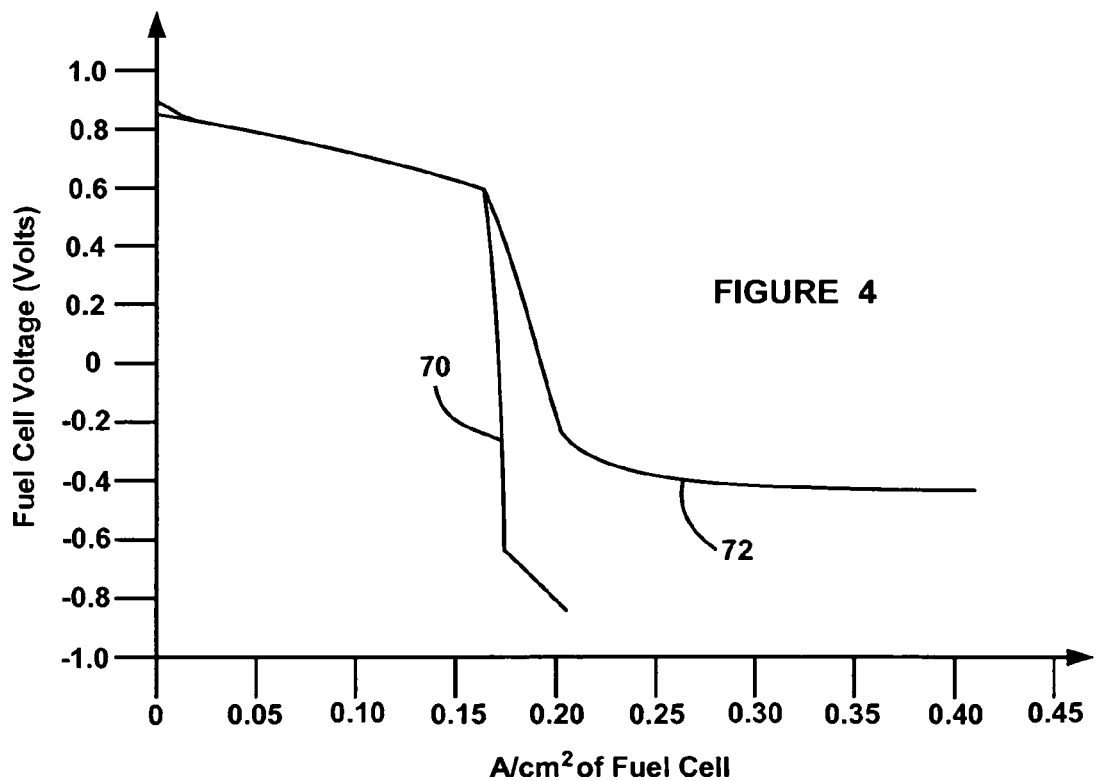
FIG. 4 is a graph with current density on the horizontal axis and voltage on the vertical axis showing the V-I response for a fuel cell diode pair.

FIG. 4 is a graph with current density on the horizontal axis and voltage on the vertical axis showing the V-I response for both the cells, where graph lines 70 is for the cell that did not include the diode and graph line 72 is for the cell that did include the diode. As can be seen, starting at no load, as the load increased, the voltage gradually decreased. At the load where one of the flows (either cathode or anode) first approaches a stoichiometry of 1.0, the rate of change in voltage changes from gradual to immediate. For the conditions above, this occurs for the anode flow at a load of 0.18 A/$cm^2$. This rapid decrease in the voltage as the 0.2 A/$cm^2$ load is approached is apparent from FIG. 4.

After this sharp decrease, the effect of the diode becomes apparent for the fuel cell including the diode. The voltage falls to about −300 mV, but then falls only about an additional 100 mV over an additional loading of 0.2 A/$cm^2$. For the fuel cell having no diode, a voltage reversal to 900 mV occurs, and no additional load can be drawn. The difference in the graph lines 70 and 72 after reversal demonstrates the effectiveness of the diode at carrying load beyond what an overloaded cell could carry by itself, while preventing the cell from falling to a catastrophic voltage. The characteristics of the diode could be further adjusted to maintain the voltage of the cell closer to zero volts as opposed to approximately −400 mV obtained in this example.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising:
    a first bipolar plate;
    a second bipolar plate;
    an MEA positioned between the first and second bipolar plates; and
    a thin-sheet diode positioned adjacent to the MEA and being electrically coupled to the first and second bipolar plates, wherein the diode is non-conductive when a potential between the first bipolar plate and the second bipolar plate is within a predetermined voltage range, and wherein the diode becomes conductive when the potential between the first and second bipolar plates is slightly negative so that the potential between the first and second bipolar plates does not go significantly below zero.

2. The fuel cell according to claim 1 wherein the thin-sheet diode is a PN diode.

3. The fuel cell according to claim 1 wherein the thin-sheet diode includes doped semiconductor layers.

4. The fuel cell according to claim 3 wherein the thin-sheet diode includes semiconductor layers selected from the group consisting of InAs and GaInAs.

5. The fuel cell according to claim 3 wherein the thin-sheet diode includes a semiconductor substrate layer, a buffer layer deposited on the substrate layer, a tunnel junction deposited on the buffer layer, p-n diode layers deposited on the tunnel junction and an N-contact layer deposited on the p-n diode layers.

6. The fuel cell according to claim 5 wherein the substrate layer is an n-type InAs wafer, the buffer layer is a 2000 Å n-type InAs layer, the tunnel junction includes an N+ 1000 Å InAs layer doped with silicon at $-1.0 \times 10^{19}$ and a P+ 1000 Å InAs layer doped with beryllium at $1.0 \times 10^{19}$, the p-n diode layers include a 1000 Å InAs P layer doped with beryllium at $1.0 \times 10^{18}$ and a 2000 Å InAs undoped N layer 60, and the N-contact layer is a 2000 Å InAs N layer doped with silicon at $-1.0 \times 10^{19}$.

7. The fuel cell according to claim 1 wherein the thin-sheet diode has a thickness in the range of 50 microns to 1.3 mm and an area in the range of 0.2-5.0 $cm^2$.

8. The fuel cell according to claim 1 wherein the diode is non-conductive between a potential of about zero and about +1 volts between the first and second bipolar plates.

9. The fuel cell according to claim 1 wherein the fuel cell is part of a fuel cell stack.

10. The fuel cell according to claim 9 wherein the fuel cell stack is on a vehicle.

11. A fuel cell comprising:
a first bipolar plate;
a second bipolar plate;
an MEA positioned between the first and second bipolar plates; and
a thin-sheet p-n diode positioned adjacent to the MEA and being electrically coupled to the first and second bipolar plates, said p-n diode including doped InAs semiconductor layers, wherein the diode is non-conductive when a potential between the first bipolar plate and the second bipolar plate is within a predetermined voltage range, and wherein the diode becomes conductive when the potential between the first and second bipolar plates is near −0.1V so that the potential between the first and second bipolar plates does not go significantly below zero.

12. The fuel cell according to claim 11 wherein the thin-sheet p-n diode includes a semiconductor substrate layer, a buffer layer deposited on the substrate layer, a tunnel junction deposited on the buffer layer, p-n diode layers deposited on the tunnel junction and an N-contact layer deposited on the p-n diode layers.

13. The fuel cell according to claim 12 wherein the substrate layer is an n-type InAs layer, the buffer layer is a 2000 Å n-type InAs layer, the tunnel junction includes an N+ 1000 Å InAs layer doped with silicon at $-1.0 \times 10^{19}$ and a P+ 1000 Å InAs layer doped with beryllium at $1.0 \times 10^{19}$, the p-n diode layers include a 1000 Å InAs P layer doped with beryllium at $1.0 \times 10^{18}$ and a 2000 Å InAs undoped N layer 60, and the N-contact layer is a 2000 Å InAs N layer doped with silicon at $-1.0 \times 10^{19}$.

14. The fuel cell according to claim 11 wherein the thin-sheet diode has a thickness in the range of 50 microns to 1.3 mm and an area in the range of 0.2-5.0 cm$^2$.

15. The fuel cell according to claim 11 wherein the p-n diode is non-conductive between a potential of about zero and about +1 volts between the first and second bipolar plates.

16. The fuel cell according to claim 11 wherein the fuel cell is part of a fuel cell stack.

17. The fuel cell according to claim 16 wherein the fuel cell stack is on a vehicle.

18. A fuel cell stack for a vehicle, said stack including a plurality of fuel cells, each fuel cell comprising:
a top bipolar plate;
a bottom bipolar plate;
an MEA positioned between the top and bottom bipolar plates so as to define an anode flow channels between the top bipolar plate and the MEA and a cathode flow channels between the bottom bipolar plate and the MEA; and
a thin-sheet p-n diode positioned adjacent to the MEA and being electrically coupled to the first and second bipolar plates, said p-n diode including doped InAs semiconductor layers, wherein the p-n diode is non-conductive between a potential of about zero and about +1 volts across the top and bottom bipolar plates, and wherein the diode becomes conductive when the potential across the top and bottom bipolar plates is slightly negative so that the potential across the top and bottom bipolar plates does not go significantly below zero.

19. The fuel cell according to claim 18 wherein the thin-sheet p-n diode includes a semiconductor substrate layer, a buffer layer deposited on the substrate layer, a tunnel junction deposited on the buffer layer, p-n diode layers deposited on the tunnel junction and an N-contact layer deposited on the p-n diode layers.

20. The fuel cell according to claim 19 wherein the substrate layer is an n-type InAs wafer, the buffer layer is a 2000 Å n-type InAs layer, the tunnel junction includes an N+ 1000 Å InAs layer doped with silicon at $-1.0 \times 10^{19}$ and a P+ 1000 Å InAs layer doped with beryllium at $1.0 \times 10^{19}$, the p-n diode layers include a 1000 Å InAs P layer doped with beryllium at $1.0 \times 10^{18}$ and a 2000 Å InAs undoped N layer 60, and the N-contact layer is a 2000 Å InAs N layer doped with silicon at $-1.0 \times 10^{19}$.

21. The fuel cell according to claim 18 wherein the thin-sheet diode has a thickness in the range of 50 microns to 1.3 mm and an area in the range of 0.2-5.0 cm$^2$.

* * * * *